United States Patent

Kuo

[11] Patent Number: 5,886,754
[45] Date of Patent: Mar. 23, 1999

[54] LIQUID CRYSTAL DISPLAY PROJECTOR

[75] Inventor: Chen-Lung Kuo, Hsinchu, Taiwan

[73] Assignee: Industrial Technology Research Institute, Hsinchu, Taiwan

[21] Appl. No.: 785,481

[22] Filed: Jan. 17, 1997

[51] Int. Cl.⁶ .............................. G02F 1/1335; G02F 1/13
[52] U.S. Cl. .................................. 349/8; 349/99; 349/179
[58] Field of Search .................................. 349/8, 179, 99

[56] References Cited

U.S. PATENT DOCUMENTS

| | | |
|---|---|---|
| 4,936,656 | 6/1990 | Yamashita et al. ..................... 350/333 |
| 4,989,954 | 2/1991 | Yokoyama et al. ..................... 350/337 |
| 5,105,289 | 4/1992 | Sonohara et al. ..................... 359/70 |
| 5,691,785 | 11/1997 | Usui et al. ..................... 349/8 |

*Primary Examiner*—William L. Sikes
*Assistant Examiner*—Julie Ngo

[57] ABSTRACT

A projection-type display device using twisted nematic liquid crystal light valves having multi-twist and/or multi-polarization angles. The photoelectric transfer characteristics of three light valves are optimized for reflecting red, green and blue light with high efficiency and similar reflectivity by selecting proper twisted angle and polarization angle for each corresponding liquid crystal light valve. The twisted angle or polarization biasing angle of each light valve may be different.

8 Claims, 5 Drawing Sheets

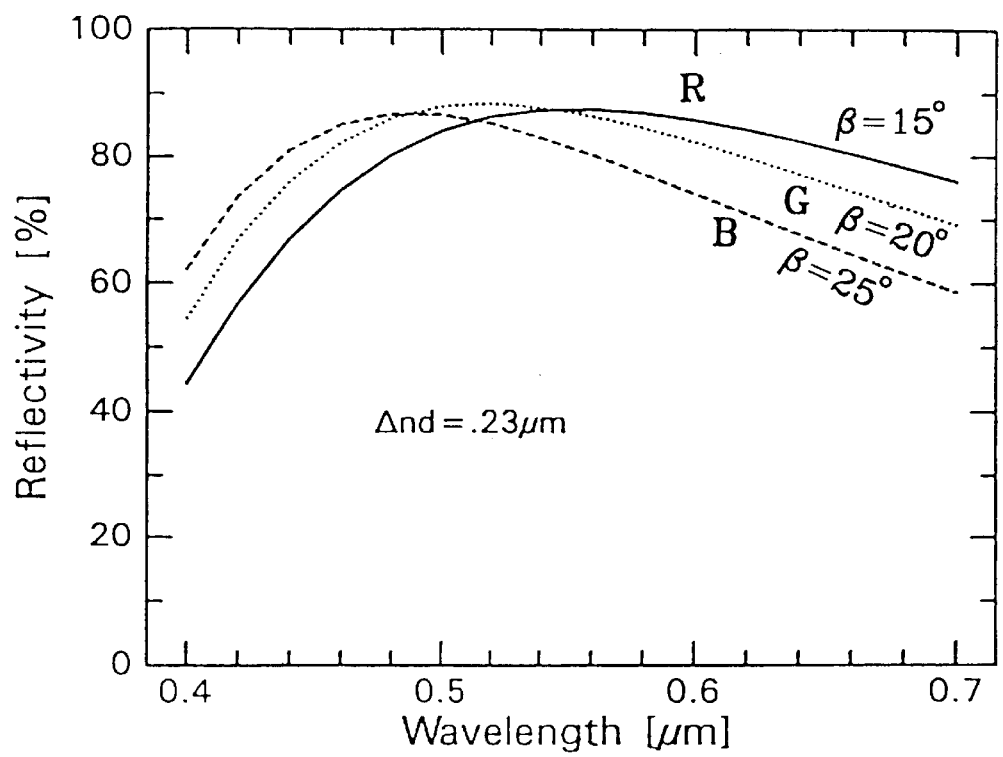
F I G.2

LIQUID CRYSTAL DISPLAY PROJECTOR

FIELD OF THE INVENTION

The present invention relates to a projection-type display device, and more specifically to a colored projection-type display device using liquid crystal light valves.

BACKGROUND OF THE INVENTION

Projection-type display devices using liquid crystal light valves become highly popular because of their compact size and light weight as compared to conventional projection-type display devices using cathode ray tubes. Many different liquid crystal light valves have been presented for improving gray scale, color reproducibility, and color purity as well as resolution and contrast ratio. As an example, U.S. Pat. No. 4,995,702 issued to Aruga shows a projection-type display device using three twisted nematic liquid crystal light valves. The product of the birefringence and the thickness of the liquid crystal cell is selected to fall within a predetermined optimal range of values dependent on the wavelength of light which travels through the light valve.

Liquid crystal light valves have been used in both reflection-type and transmission-type projection display. In general, high efficiency, high contrast, low color difference and low driving voltage are four important requirements for the liquid crystal valves used in projection displays. Twisted nematic (TN) liquid crystal cells have been widely used in transmission-mode active matrix liquid crystal displays of high quality. However, when a transmission-mode TN cell is used in reflective-mode display, it results in poor brightness and low resolution.

U.S. Pat. No. 5,105,289 issued to Sonehara et al. describes an improved reflection-type projection display with liquid crystal electro-optical device by optimizing the twist angle, the product of layer thickness and birefringence of the liquid crystal cell. Mixed-mode twisted nematic (MTN) liquid crystal cells for reflection-type projection displays have also been proposed by Wu et al. lately in (1) ixed-mode twisted nematic liquid crystal cells for reflective displays" of Applied Physics Letter Vol. 68, No. 11, pp. 1455–1457, 11 Mar. 1996, (2) igh-Brightness Projection Displays Using Mixed-Mode Twisted-Nematic Liquid-Crystal Cells" of SID 96 Digest, pp. 763–766, and (3) igh Brightness Liquid Crystal Projection Displays" of Japan Journal of Applied Physics, Vol. 35, No. 10, pp. 5349–5354, October 1996.

The structure and fabrication process of the MTN cell are nearly identical to a conventional 90° TN cell except for two major differences. One is that MTN cell has a smaller product of birefringence and thickness than a nominal TN cell. The other 2 is that the front director of the MTN cell must be aligned at an angle to the polarization state of the incident light. In Wu prior arts (2) and (3), mixed mode chiral-homeotropic cells (or inverse TN cells) are introduced for reflective-mode displays. In a voltage-off state, the liquid crystal directors are aligned perpendicular to substrates in spite of the existence of the chiral molecules. In a voltage-on state, they tend to follow the twist of the chiral molecules and act as a TN cell. The electro-optic effects of a reflective mixed-mode chiral-homeotropic cell is equivalent to an inverse MTN cell.

SUMMARY OF THE INVENTION

The present invention has been made to reduce the color dispersion and improve the light efficiency of a projection-type display. The primary object of this invention is to provide a projection-type display device using liquid crystal light valves which produces an image having good color purity, high brightness and high contrast.

The photoelectric transfer characteristics of projection-type display devices using liquid crystal light valves during its TN mode of operation are dependent on the wavelengths of the incident light. In this invention, mixed mode twisted nematic liquid crystal cells are used as the light valves of projection-type display devices. The photoelectric transfer characteristics of each light valve are optimized with respect to the wavelength of light incident to the valve in order to enhance light efficiency and reduce color difference.

According to this invention, the polarization angle between the incident polarization and the front liquid crystal director as well as the twisted angle between the front liquid crystal director and the back liquid crystal director of a liquid crystal light valve are chosen carefully for green, red, or blue light. By properly selecting the incident polarization angles and the twisted angles, the difference in the photoelectric transfer characteristics due to the wavelength can be minimized.

Because the structure and fabrication of a MTN liquid crystal cells are almost identical to a conventional TN liquid crystal cells. No extra process or machine cost is required for the liquid crystal light valves used in the projection-type display devices of this invention.

BRIEF DESCRIPTION OF THE DRAWINGS

FIG. 2 shows the reflectivity as a function of wavelength for a liquid crystal light valve having a birefringence and thickness product equal to 0.23 with a polarization angle equal to 15°, 20°, or 25°.

DETAILED DESCRIPTION OF THE PREFERRED EMBODIMENTS

Figure 1:
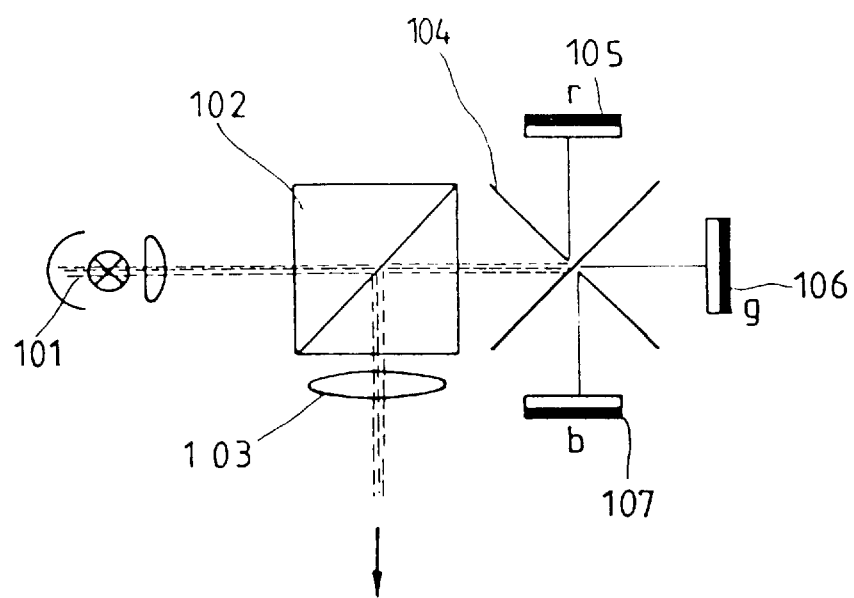
FIG. 1 shows a top plan view of a reflective type projection display device.

With reference to FIG. 1, a reflection-type projection display comprises a light source 101, a polarizing beam splitter 102, a projection lens 103, dichroic mirrors 104, and three light valves 105, 106 and 107. White light from the light source passing through the polarizing beam splitter 102 is separated by the dichroic mirrors 104 into red, green, and blue light traveling along three different paths. The light in each path is controlled and reflected by a liquid crystal cell light valve The reflected light from the three different paths is combined by the dichroic mirrors 104 to synthesize light that represents an image pattern being used to control the light valves. The synthesized light is directed towards the projection lens 103 by the polarizing beam splitter 102 and then projected to a screen.

Each light valve has a front liquid crystal director and a back liquid crystal director. The angle between the front and back liquid crystal directors are the twisted angle of a light valve. The photo-electric transfer characteristics of a light valve is determined by the birefringence $\Delta n$ and the thickness d of the liquid crystal cell for TN cell having a 90 degree twisted angle.

The twisted angle $\phi$ between the front and the back liquid crystal directors of a liquid crystal cell controls how much light can be passed through the light valve. The polarization angle $\beta$ between the incident light polarization and the front liquid crystal director also affects the light efficiency. An MTN cell aligns the incident polarization and the front director so that the angle $\beta$ is not zero. The light reflectivity of a light valve using the MTN cell is wavelength dependent. FIG. 2 shows an example of the light reflectivity of a MTN cell having 90 degree twisted angle and thickness d=3 $\mu$m as a function of wavelength for three different $\beta$ angles. It can be seen that the light in the red range has best reflectivity when the angle $\beta$ is 15°. The green light has maximum reflectivity if the angle $\beta$ is 20°. The blue light is reflected most efficiently when the angle $\beta$ is 25°.

Figure 3:
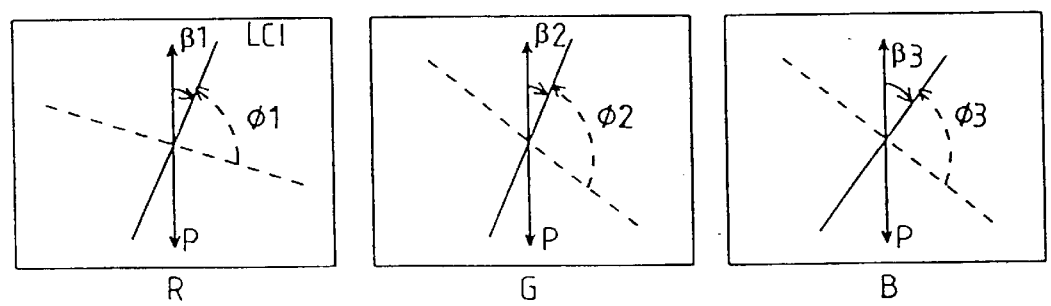
FIG. 3 shows an example of the twisted angles and polarization angles for the light valves of the present invention in the red, green and blue light paths.

According to this invention, the light valves 105, 106, and 107 are manufactured with identical thickness. The photo-electric characteristics of the light valves in the green, red, and blue light paths are optimized by selecting different $\beta$ angles and/or different twisted angles. FIG. 3 illustrates an example of the orientations of the front liquid crystal director LC1 and the back liquid crystal director LC2 and the incident polarization P for the light valves for optimizing the red, green, and blue light efficiency. Dependent on the birefringence and the thickness of the light valves, the twisted angles may be chosen identical or different.

Figure 4A:
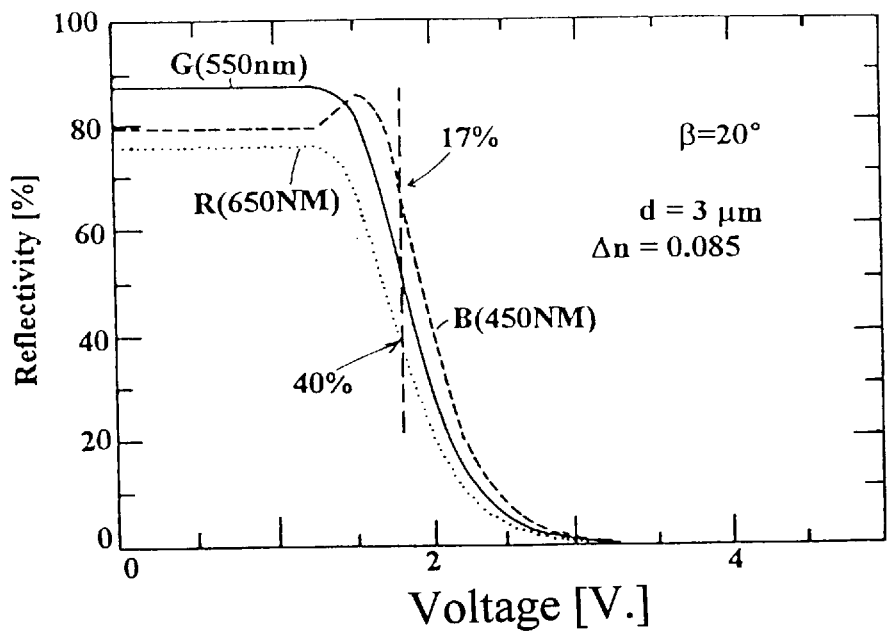
FIG. 4A shows the simulation results of the normalized reflectance for red, green and blue light as a function of applied voltage using light valves having reflective MTN cells with 90° twisted angle and 20° polarization angle.
Figure 4B:
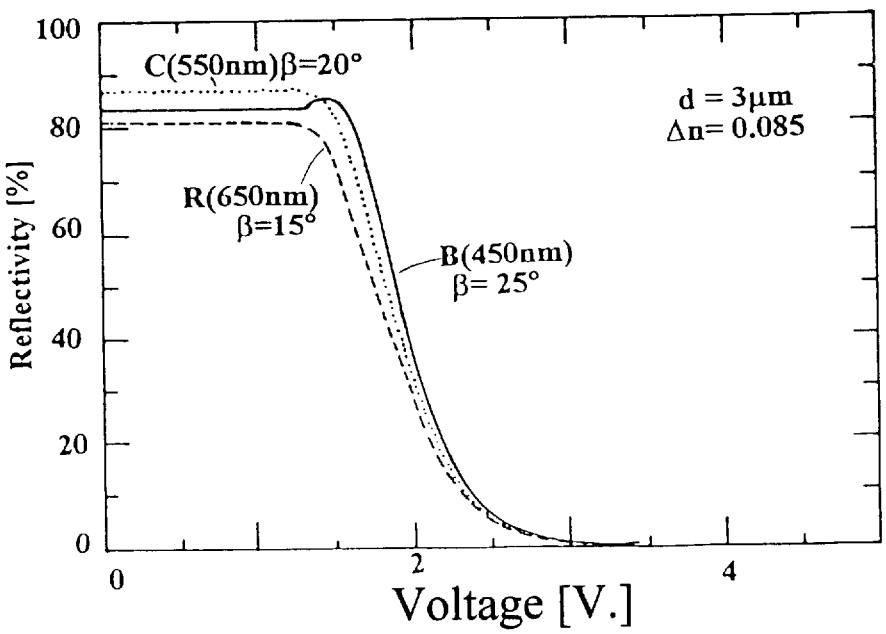
FIG. 4B shows the simulation results of the normalized reflectance for red, green and blue light as a function of applied voltage using light valves having reflective MTN cells with 90° twisted angle assuming that the polarization angle has been optimized to 15°, 20°, and 25° for red, green and blue light respectively.

FIG. 4 shows the simulation results for the reflectivity of a reflective MTN cell having 90 degree twisted angle and 3 $\mu$m thickness. The birefringence $\Delta n$ of the cell is 0.085. FIG. 4A shows the normalized reflectance as a function of applied voltage for red, green and blue light assuming that the angle $\beta$ is 20 degrees. As can be seen from the result, the maximum difference of the reflectivity for 450 nm wavelength (blue light) and 650 nm wavelength (red light) can be more than 20% when the applied voltage is between 1.5 to 2 volts. However, if the angle $\beta$ is optimized for each of the three different wavelength as presented in this invention , the maximum difference of the reflectivity is reduced to less than 10% as shown in FIG. 4B. The $\beta$ angles for 450 nm, 550 nm, and 650 nm wavelength light are 25°, 20° and 15° respectively.

Figure 5A:
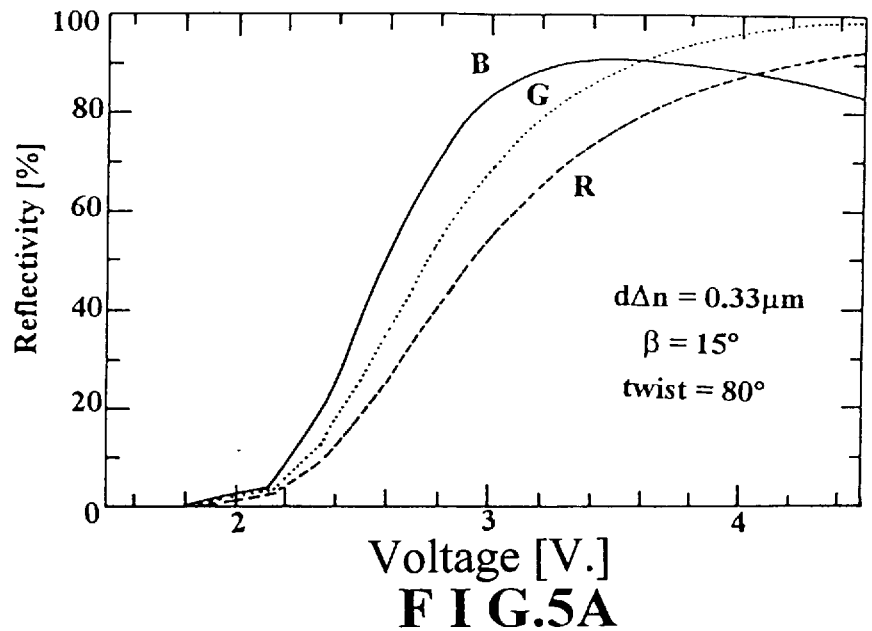
FIG. 5A shows the simulation results of the normalized reflectance for red, green and blue light as a function of applied voltage using light valves having reflective chiral-hometropic cells with 80° twisted angle and 15° polarization angle.
Figure 5B:
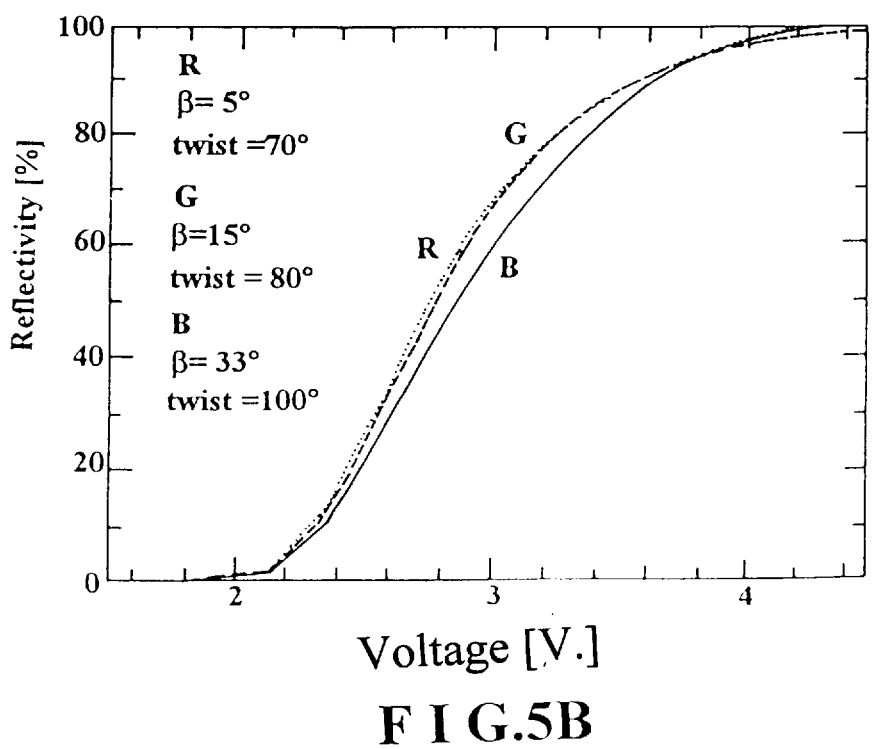
FIG. 5B shows the simulation results of the normalized reflectance for red, green, and blue light as a function of applied voltage using light valves having reflective chiral-hometropic cells with 70° twisted angle and 5° polarization angle for reflecting red light, 80° twisted angle and 15° polarization angle for reflecting green light, and 100° twisted angle and 33° polarization angle for reflecting blue light.

FIG. 5 shows the simulation results for the reflectivity of a reflective mixed-mode chiral-homeotropic cell. The birefringence and thickness product $d\Delta n$ of the liquid crystal cell equals to 0.33. The normalized reflectivity of the red, green and blue light with a constant angle $\beta$=15° and an 80° twisted angle is shown in FIG. 5A. The simulation results show that the reflectivity differs greatly for different color of light. If both the angle $\beta$ and the twisted angle are optimized for each wavelength, the reflectivity can be improved significantly as shown in FIG. 5B. For the liquid crystal cell reflecting red light, the angle $\beta$ is 5° and the twisted angle is 70°. The angle $\beta$ is 15° and the twisted angle is 80° for the liquid crystal cell for green light. The angle $\beta$ is 33° and the twisted angle is 100° for the liquid crystal cell for blue light.

Based on the simulation results, it can be seen that the liquid crystal light valves of this invention can enhance light efficiency as well as reduce color difference of a projection-type display. The thickness of the liquid crystal cells can be chosen identical. The fabrication and structure of the light valves are almost identical to a conventional twisted nematic crystal cells. In addition, the twisted and/or the polarization angle can be easily controlled by changing the programmed procedure of rubbing process. Therefore, no extra process or machine cost is necessary.

What is claimed is:

1. A projection-type display device for projecting an image to a screen by a plurality of light valves, comprising:
    a polarizing beam splitter for transmitting light from a light source;
    a plurality of dichroic mirrors for separating light transmitted through said polarizing beam splitter into red, green and blue light;
    a first light valve having a first twisted nematic liquid crystal cell with front and back liquid crystal directors being aligned to form a first twisted angle for controlling and reflecting the red light incident thereto, said red light being polarized and the front liquid crystal director of said first liquid crystal cell being aligned at a first polarization angle to the incident polarization of said red light, said first twisted angle and said first polarization angle being selected for reflecting the red light;
    a second light valve having a second twisted nematic liquid crystal cell with front and back liquid crystal directors being aligned to form a second twisted angle for controlling and reflecting the green light incident thereto, said green light being polarized and the front liquid crystal director of said second liquid crystal cell being aligned at a second polarization angle to the incident polarization of said green light, said second twisted angle and said second polarization angle being selected for reflecting the green light;
    a third light valve having a third twisted nematic liquid crystal cell with front and back liquid crystal directors being aligned to form a third twisted angle for controlling and reflecting the blue light incident thereto, said blue light being polarized and the front liquid crystal director of said third liquid crystal cell being aligned at a third polarization angle to the incident polarization of said blue light, said third twisted angle and said third polarization angle being selected for reflecting the blue light; and
    a projection lens;
    wherein the red light reflected from said first light valve, the green light reflected from said second light valve and the blue light reflected from said third light valve are combined by said plurality of dichroic mirrors and the combined light is reflected by said polarizing beam splitter towards said projection lens.

2. The projection-type display device according to claim 1, wherein said first, second, and third twisted angles are different.

3. The projection-type display device according to claim 1, wherein said first, second, and third polarization angles are different.

4. The projection-type display device according to claim 1, wherein said first, second, and third twisted angles are approximately 90 degrees and said first polarization biasing angle is approximately 15 degrees, said second polarization angle is approximately 20 degrees and said third polarization angle is approximately 25 degrees.

5. A projection-type display device for projecting an image to a screen by a plurality of light valves, comprising:

a polarizing beam splitter for transmitting light from a light source;

a plurality of dichroic mirrors for separating light transmitted through said polarizing beam splitter into red, green and blue light;

a first light valve having a first chiral-hometropic nematic liquid crystal cell with front and back liquid crystal directors being aligned to form a first twisted angle for controlling and reflecting the red light incident thereto, said red light being polarized and the front liquid crystal director of said first liquid crystal cell being aligned at a first polarization angle to the incident polarization of said red light, said first twisted angle and said first polarization angle being selected for reflecting the red light;

a second light valve having a second chiral-hometropic nematic liquid crystal cell with front and back liquid crystal directors being aligned to form a second twisted angle for controlling and reflecting the green light incident thereto, said green light being polarized and the front liquid crystal director of said second liquid crystal cell being aligned at a second polarization angle to the incident polarization of said green light, said second twisted angle and said second polarization angle being selected for reflecting the green light;

a third light valve having a third chiral-hometropic nematic liquid crystal cell with front and back liquid crystal directors being aligned to form a third twisted angle for controlling and reflecting the blue light incident thereto, said blue light being polarized and the front liquid crystal director of said third liquid crystal cell being aligned at a third polarization angle to the incident polarization of said blue light, said third twisted angle and said third polarization angle being selected for reflecting the blue light; and a projection lens;

wherein the red light reflected from said first light valve, the green light reflected from said second light valve and the blue light reflected from said third light valve are combined by said plurality of dichroic mirrors and the combined light is reflected by said polarizing beam splitter towards said projection lens.

6. The projection-type display device according to claim 5, wherein said first, second, and third twisted angles are different.

7. The projection-type display device according to claim 5, wherein said first, second, and third polarization angles are different.

8. The projection-type display device according to claim 5, wherein said first twisted angle is approximately 70 degrees, said second twisted angle is approximately 80 degrees and said third twisted angle is approximately 100 degrees and said first polarization angle is approximately 5 degrees, said second polarization angle is approximately 15 degrees and said third polarization angle is approximately 33 degrees.

* * * * *